United States Patent
Cousins et al.

(10) Patent No.: US 10,643,113 B2
(45) Date of Patent: May 5, 2020

(54) RETURN MAIL SERVICES

(71) Applicants: Steve Cousins, Nashville, TN (US); Nicole Blohm, Mount Pleasant, SC (US)

(72) Inventors: Steve Cousins, Nashville, TN (US); Nicole Blohm, Mount Pleasant, SC (US)

(73) Assignee: RICOH COMPANY, LTD., Tokyo (JP)

( * ) Notice: Subject to any disclaimer, the term of this patent is extended or adjusted under 35 U.S.C. 154(b) by 88 days.

(21) Appl. No.: 15/847,787

(22) Filed: Dec. 19, 2017

(65) Prior Publication Data

US 2019/0188544 A1    Jun. 20, 2019

(51) Int. Cl.
G06K 9/00    (2006.01)
G06K 9/72    (2006.01)
B07C 3/14    (2006.01)
G06F 16/583    (2019.01)

(52) U.S. Cl.
CPC .......... *G06K 9/72* (2013.01); *G06K 9/00463* (2013.01); *B07C 3/14* (2013.01); *G06F 16/5846* (2019.01); *G06K 2209/01* (2013.01); *G06K 2209/03* (2013.01)

(58) Field of Classification Search
CPC .. G06K 9/72; G06K 2209/01; G06F 16/5846; B07C 3/14
See application file for complete search history.

(56) References Cited

U.S. PATENT DOCUMENTS

| | | | |
|---|---|---|---|
| 2002/0042815 A1 | 4/2002 | Salzfass | |
| 2002/0147731 A1 | 10/2002 | Seestrom | |
| 2002/0168090 A1* | 11/2002 | Bruce | G06K 9/033 382/101 |
| 2003/0085162 A1 | 5/2003 | Daniels, Jr. et al. | |
| 2003/0182017 A1* | 9/2003 | O'Donohue | B07C 3/00 700/224 |
| 2003/0191651 A1 | 10/2003 | Hungerpiller | |
| 2009/0057207 A1 | 3/2009 | Orbke | |
| 2010/0145504 A1 | 6/2010 | Redford | |
| 2014/0189018 A1* | 7/2014 | Nawaz | G06Q 50/32 709/206 |
| 2014/0298114 A1 | 10/2014 | Aoki | |
| 2019/0279325 A1 | 9/2019 | Blohm | |

* cited by examiner

*Primary Examiner* — Xin Jia
(74) *Attorney, Agent, or Firm* — Hickman Palermo Becker Bingham LLP; Edward A. Becker

(57) ABSTRACT

In an embodiment, an apparatus comprises one or more processors and one or more memories communicatively coupled to the one or more processors and storing instructions which, when processed by the one or more processors, cause: receiving a digital image of undeliverable mail and storing the digital image in a first database; causing data to be extracted from the digital image using Optical Character Recognition (OCR) or by processing encoded data; causing additional data to be requested from a second database based on the data extracted from the digital image; automatically generating one or more options for the undeliverable mail based on the data from the first database and the additional data from the second database; and causing the digital image, the data, the additional data, and the one or more options for the undeliverable mail to be displayed using a graphical user interface.

20 Claims, 7 Drawing Sheets

RETURN MAIL SERVICES

FIELD

The technical field of the present disclosure relates to improved methods, systems, computer software, and/or computer hardware in the field of return mail services. The disclosure relates more specifically to improved computer-implemented methods and systems for digitizing and updating undeliverable as addressed mail information.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

When individuals change residences, an updated address is often needed to ensure that mail is properly delivered to the recipient. However, when a recipient moves without providing an updated address to a sender, mail that is sent to the old address cannot be delivered. Undeliverable as Addressed (UAA) mail is returned to the sender in the case of first class mail, or otherwise redirected. Subsequently, the sender and/or redistribution facilities often waste significant network bandwidth, computer processing resources, and memory searching for and attempting to compile updated recipient addresses. When these searches fail, not only are senders unable to convey promotions and outstanding bills to recipients, but recipients also miss promotions and suffer credit score decreases due to unpaid bills.

SUMMARY

The appended claims may serve as a summary. In an embodiment, an apparatus comprises one or more processors and one or more memories communicatively coupled to the one or more processors and storing instructions which, when processed by the one or more processors, cause: receiving a digital image of undeliverable mail and storing the digital image in a first database; causing data to be extracted from the digital image using Optical Character Recognition (OCR) or by processing encoded data such as a barcode; requesting additional data from a second database based on the data extracted from the digital image; automatically generating one or more options for the undeliverable mail based on the data from the first database and the additional data from the second database; and causing the digital image, the data, the additional data, and the one or more options for the undeliverable mail to be displayed using a graphical user interface.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION

In the following description, for the purposes of explanation, numerous specific details are set forth in order to provide a thorough understanding of the embodiments. It will be apparent, however, to one skilled in the art that the embodiments may be practiced without these specific details. In other instances, well-known structures and devices are shown in block diagram form in order to avoid unnecessarily obscuring the embodiments.

I. GENERAL OVERVIEW
II. SYSTEM ARCHITECTURE
 A. Processing and Management System
 B. Network
 C. Services
III. PROCEDURAL OVERVIEW
IV. PORTAL
 A. Dashboard
 B. Action Queue
 C. Details View
 D. Transfer
V. IMPLEMENTATION MECHANISMS

I. General Overview

According to various embodiments, computer-implemented apparatus, methods, and systems are provided that enable improved return mail services that may be provided on-premise and through a central delivery system. These return mail services include receiving scanned images of UAA mail and extracting data by performing OCR or scanning a barcode or other encoded data, determining a recipient of the UAA mail, checking one or more databases for updated addresses of the recipient, and displaying the information through a return mail service portal for subsequent action. The services may also include determining a sender of the undeliverable mail and classifying the data into action queues based on the sender information and/or the type of mail for display in the portal. In an embodiment, a minimum action queue assignment may be determined. Technical benefits include improved computer and system efficiency by shifting the computer storage, memory, and processing burdens of determining updated mailing addresses away from senders. This decreases the excessive use of network bandwidth, as well as decreases the use of processing resources, such as CPU usage, and memory that the computing systems of the sender would otherwise waste on searching for updated mailing addresses. The distributed system architecture also has the added benefit of distributing processing resources such that overburdening a single computer is avoided.

II. System Architecture

Figure 1:
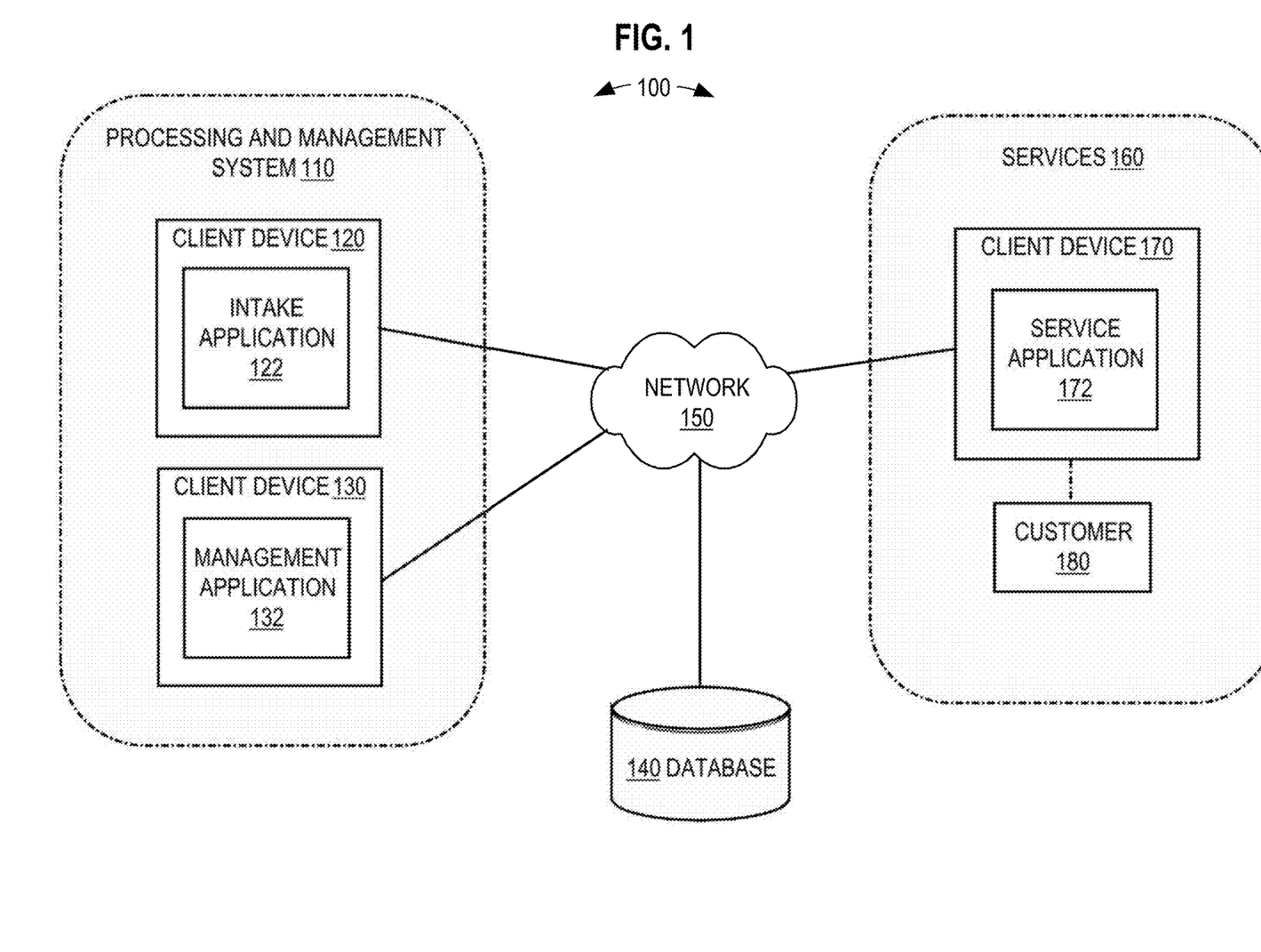
FIG. 1 depicts a networked computer system.

FIG. 1 depicts a networked computer system 100. In an embodiment, the computer system 100 comprises components that are implemented at least partially by hardware at one or more computing devices, such as one or more hardware processors executing program instructions stored in one or more memories for performing the functions that are described herein. All functions described herein are intended to indicate operations that are performed using programming in a special-purpose computer or general-purpose computer, in various embodiments. A "computer" or "computing device" may be one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. Any reference to "a computer" or "a computing device" herein may mean one or more computers, unless expressly stated otherwise. The instructions identified above are executable instructions and may comprise one or more executable files or programs that have been compiled or otherwise built based upon source code prepared in JAVA, C++, OBJECTIVE-C or any other suitable programming environment.

FIG. 1 depicts only one of many possible arrangements of components configured to execute the programming described herein. Other arrangements may include fewer or different components, and the division of work between the components may vary depending on the arrangement. In the example of FIG. 1, a networked computer system 100 may facilitate the secure exchange of data between computing devices of a processing and management system 110 and services 160. Therefore, each element of 110 and 160 of FIG. 1 may represent or be associated with one or more computers that host or execute processes that provide the functions and operations that are described further herein in connection with the processing and management system 110 or services 160. The networked computer system 100 is not limited the particular elements depicted in FIG. 1 and may include fewer or additional elements depending upon a particular implementation.

A. Processing and Management System

Processing and management system 110 may be a system configured to provide intake, processing, and management of UAA mail. Embodiments are depicted in the figures and described herein in the context of a single processing and management system 110 for the purposes of explanation, but any number of processing and management systems may be used.

The processing and management system 110 may feature a client device 120. In an embodiment, the client device 120 may be any type of client device 120 or a combination of client devices, including but not limited to a display screen, a workstation, a personal computer, a laptop computer, a tablet computing device, a personal digital assistant, or a smartphone. Client device 120 may equipped with or be associated with a scanner, camera, or any other device configured to capture a digital image. The client device 120 may also be a specialty device configured to open, prepare, and scan envelopes and/or the inner contents of envelopes. Although embodiments are depicted in the figures and described herein in the context of a single client device 120, embodiments are not limited to this example and any number of client devices may be used.

The client device 120 may execute an intake application 122, which allows a user to process UAA mail in association with the camera, scanner, or other image capture device. For example, client device 120 may be an integrated workstation, scanner, and envelope opener. Intake application 122 may be a software application that causes the integrated workstation, scanner, and envelope opener to scan the envelope, open the envelope, and/or scan the inner contents of the envelope. In another embodiment, client device 120 may be a laptop or desktop connected to a scanner. Intake application 122 may be a scanner software application installed on the laptop or desktop that enables a user to access and control the scanner and capture a digital image of the outer envelope and/or the inner contents of the UAA. In another embodiment, the client device 120 may be a smartphone that features a camera. Intake application 122 may be a scanner application installed on the smartphone that enables a user to access and control the camera to capture a digital image of outer envelope and/or inner contents of the UAA mail.

The processing and management system 110 may also feature a client device 130. In an embodiment, the client device 130 may be any type of client device 130 or a combination of client devices, including but not limited to one or more server computers. Although embodiments are depicted in the figures and described herein in the context of a single client device 130, embodiments are not limited to this example and any number of client devices may be used. For example, client device 130 may be multiple computers acting in conjunction with a web server to receive digital images of envelopes and/or inner contents of the UAA mail, check for updated mailing addresses from third-party databases, and store, categorize, organize, and display the digital images in association with their respective updated mailing addresses.

The client device 130 may execute management application 132. Management application 132 may receive and store the digital images of envelopes and/or the inner contents of the UAA mail and any relevant data in a database associated with the client device 130. In an embodiment, the management application 132 may also receive additional updated data related to the UAA mail from third party database, and store, categorize, organize the digital images and updated data for subsequently user access through a customer portal, as further described herein.

B. Database

In an embodiment, updated mailing addresses may be retrieved from database 140. As used herein, the term "database" refers to a corpus of data, organized or unorganized, in any format, with or without a particular interface for accessing the corpus of data. The database 140 may be a third-party address correction database, such as the National Change of Address (NCOA) database and/or a Proprietary Change of Address (PCOA) database. The NCOA database may be, for example, the federal postal service's database for mail forwarding and address changes. A PCOA database may be any private database that maintains a record of addresses, such as a bank database, or any other private entity's database. Although embodiments are depicted in the figures and described herein in the context of a single database 140, embodiments are not limited to this example and any number of databases may be used. For example, the NCOA database, a PCOA database associated with a bank, and a PCOA associated with a private lender may all be used. Any number of address correction databases may be used.

C. Network

Network 150 broadly represents any number and type of wired or wireless networks, such as a combination of one or more local area networks (LANs), wide area networks (WANs), global interconnected internetworks, such as the public Internet, or a combination thereof. Each such network may use or execute stored programs that implement internetworking protocols according to standards such as the Open Systems Interconnect (OSI) multi-layer networking model, including but not limited to TCP or UDP, IP, HTTP, and so forth. All computers described herein may be configured to connect to the network 150 and the disclosure presumes that all elements of FIG. 1 are communicatively coupled via network 150. The various elements depicted in FIG. 1 may also communicate with each other via direct communications links that are not depicted in FIG. 1 for purposes of explanation.

D. Services

Services 160 may be return mail services that are provided to customers. In some embodiments, a client device 170 may be associated with a customer 180 such that the customer may access a return mail services portal through a service application 172 executed on the client device 170. The design of networked computer system 100 is such that services 160 may be delivered centrally and on-premise, in some embodiments. The client device 170 may be any type of client device, including but not limited to a workstation, a personal computer, a laptop computer, a tablet computing device, a personal digital assistant, or a smartphone. The service application 122 may be implemented by any number and types of processes executing on client device 170. For example, the service application 172 may be a web browser configured to access a web-based portal or website that is hosted on a remote server, such as client device 130. In another embodiment, the service application 172 may be a specialized software application installed locally on the client device 120.

III. Procedural Overview

Figure 2:
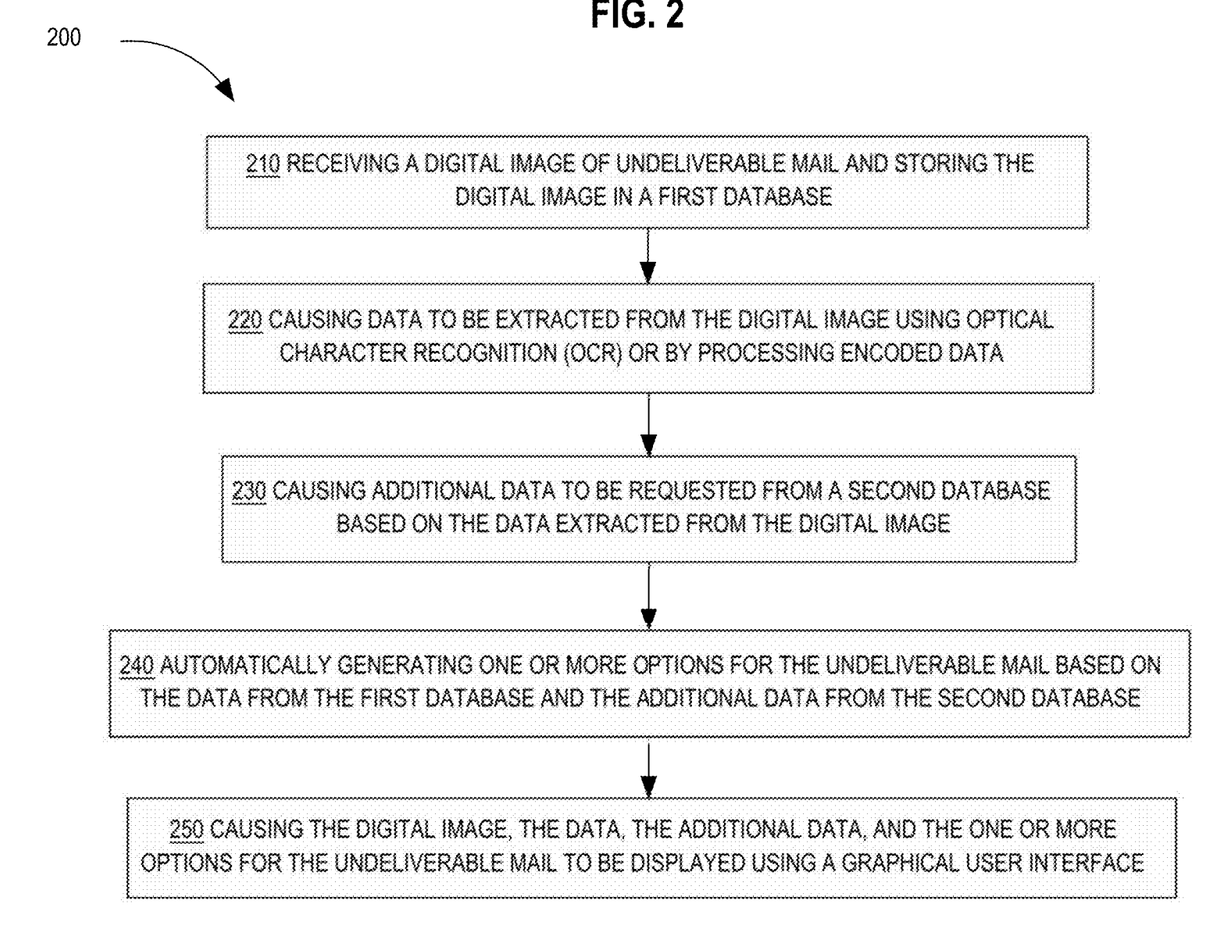
FIG. 2 is a flow diagram that depicts a method or algorithm for return mail services.

FIG. 2 is a flow diagram that depicts a method or algorithm for return mail services. The method 200 utilizes processing and management system 110 to scan UAA mail envelopes and/or content and store the scanned information, for example, by uploading the scanned information to a cloud server for storage. In an embodiment, the computer system may perform OCR to determine a recipient of the UAA mail, and check third-party databases for an updated address. In another embodiment, the computer system may process encoded data to determine a recipient of the UAA mail, and check third-party databases for an updated address. The encoded data may be, for example, a barcode, Quick Response (QR) matrix barcode, or any other optical representation of data. In another embodiment, a combination of both OCR and encoded data processing may be used. In an embodiment, the computer system may also perform OCR and/or process encoded data to determine a sender of the UAA mail and use the sender's information to classify the UAA mail into action queues. In an embodiment, the computer system may also organize and display the envelope and content images, any data associated with the envelope and content images, as well as updated addresses to customers through a GUI.

At step 210, the client device 130 receives a digital image of undeliverable mail and stores the digital image in a first database. Specifically, a server may receive a scanned image of envelopes and/or the inner contents of envelopes for UAA mail from client device 120. In an embodiment, client device 120 may be a high-volume, integrated workstation, scanner, and envelope opener that generates digital images of envelopes and/or inner content by using an intake application 122 to scan envelopes, open envelopes, and/or scan the inner contents of the envelopes. In an embodiment, intake application 122 may also send the digital images to client device 130. Once the digital images of UAA mail are received by client device 130, the client device 130 may store the digital images in a database associated with the client device 130.

At step 220 the client device 130 may cause data to be extracted from the digital image using optical character recognition (OCR). In some embodiments, the client device 130 may execute a local OCR program to extract data from the envelope and/or inner contents. In another embodiment, the client device 130 may coordinate with third party servers that run OCR programs and provide the extracted data to the client device 130. In another embodiment, the client device 130 may cause data to be extracted by processing encoded data. The encoded data may be any type of computer-readable data, such as a barcode, QR matrix barcode, or any other type of encoded data. For example, the encoded data may be a two-dimensional barcode that stores unique user identification (UID) information. When the barcode is scanned, the client device 130 may match the UID to a UID stored in a database that is associated with the client device 130. The database may be, for example, a customer database storing the UID and any associated mailing information. In some embodiments, the client device 130 may process the encoded data locally to match the UID and extract the associated data. In another embodiment, the client device 130 may coordinate with third party devices that process the encoded data, extract any associated data, and provide the extracted data to the client device 130.

The extracted data may be, for example, the name and address of the recipient, the name and address of the sender (return address), the mail class, and data representing the inner contents of the envelope. The name or address of the sender may designate a specific department that the UAA mail came from, which may indicate a specific type of mail. For example, some senders may have a department dedicated to credit cards that is associated with a particular post office box (P.O. Box) and a separate department dedicated to motor finance that is associated with another P.O. Box. Any number of departments and any number of specific types of mail may be identified. In another embodiment, the type of mail may include, for example, a bill, a general advertisement, a specific promotional offer, or any other type of mail. The sender and/or the type of mail may subsequently be used to assign mail into action queues, as further described herein.

At step 230, the client device 130 may cause additional data to be requested from a second database based on the data extracted from the digital image. For example, client device 130 may determine the name of an intended recipient based on the name extracted from the digital image of the envelope. The client device 130 may subsequently obtain an updated address for the intended recipient from one or more third-party databases, such as database 140. In an embodiment, the client device 130 may obtain the updated address directly from database 140. In another embodiment, the client device 130 may coordinate with third party servers that request updated address from database 140 and provide the updated address to the client device 130.

Database 140 may be a third-party address correction database such as the NCOA database associated with the United States Postal Service or a PCOA database associated with private entities. Individuals who change residences sometimes request mail forwarding or update their address with various private entities, such as their bank, utility provider, or any other entity. Mail forwarding is recorded in the NCOA database while requests to various private entities are recorded in PCOA databases. In an embodiment, the step of 230 may include checking the NCOA database and PCOA databases for updated mailing addresses.

At step 240, the client device 130 may automatically generate one or more options for the undeliverable mail based on the data from the first database and the additional data from the second database. For example, if an updated address is found in association with the name of a recipient, the client device 130 may generate an option to update, correct, or replace the recipient's address. For example, in an embodiment, the client device 130 may generate an option to transfer or export the new address to a sender's enterprise resource planning (ERP) or customer relationship management (CRM) system where the address may be corrected and the new address stored in the sender's database. If an updated address is not found, the client device 130 may generate an option for follow-up, such as checking the database 140 at a later time. Additional options like re-mailing the UAA mail to an updated address may also be generated. All options may be customizable to fit sender needs and are therefore not limited to the embodiments described above. These options may be generated for subsequent display through GUIs using the management application 132 of the client device 130, in an example embodiment.

At step 250, the client device 130 may cause the digital image, the data, the additional data, and the one or more options for the undeliverable mail to be displayed using a GUI. In an embodiment, client device 130 may host a web-based portal for information and options related to UAA for user access. For example, a customer 180 may use a client device 170 and a service application 172 to login and access a return mail service portal. The customer 180 may be, for example, a sender, an employee or agent of the sender, or anyone associated with the sender. The service application 172 may be configured to access and display the portal in a display screen of the client device 170.

The return mail service portal may enable a user to access the digital image, the data corresponding to the old address, and the additional data corresponding to the new address. The return mail services portal may be configured to use the sender's address that was obtained at step 220 to automatically classify the digital image of the UAA mail and any data associated with the digital image into action queues. These action queues may be organized by sender or department such that UAA mail related only to specific senders or departments may be viewed and acted upon. The action queues may also be organized by the type of mail, or a by a combination of the sender, department, and the type of mail.

The portal may also provide options for correcting or replacing the recipient address. For example, in an embodiment, the portal may feature an option for transferring or exporting the additional data corresponding to the new address to a sender's enterprise resource planning (ERP) or customer relationship management (CRM) systems such that the recipient's address may be updated in the sender's databases. This would allow the sender to send a piece of mail to the corrected address during their next mailing cycle. In another embodiment, the portal may feature an option for transferring or exporting the additional data corresponding to the new address to a sender's call center for subsequent follow-up. In another embodiment, the portal may feature an option to forward the UAA mail to the new address.

In an embodiment, one or more of the example options discussed herein may be automatically implemented. For example, the client device 130 may be configured to automatically cause the transferring or exporting of the data representing the new address to the ERP and/or CRM systems to update the address in the sender's database. In another embodiment, the client device 130 may be configured to automatically cause transferring or exporting of the data representing the new address to a call center. The client device 130 may also be configured to automatically cause forwarding the UAA mail to the new address.

All action queues and options available may be customizable to fit customer needs and are, therefore, not limited to the embodiments described above. For example, one action queue maybe configured with a first set of actions or options to be performed while a second action queue may be configured with a second set of actions or options to be performed.

III. Portal

Each device in the networked computer system 100 may feature a GUI with controls that visually present options to users through a display of the computing device. In some embodiments, the GUI may enable users to view, interact with, change, and update information related to UAA mail through a return mail service portal. Additional details of the GUI controls are described herein. The following embodiments are examples and are not intended to be limiting. Some GUIs may feature more controls, less controls, and/or different controls from those featured in the examples herein.

A. Dashboard

Figure 3:
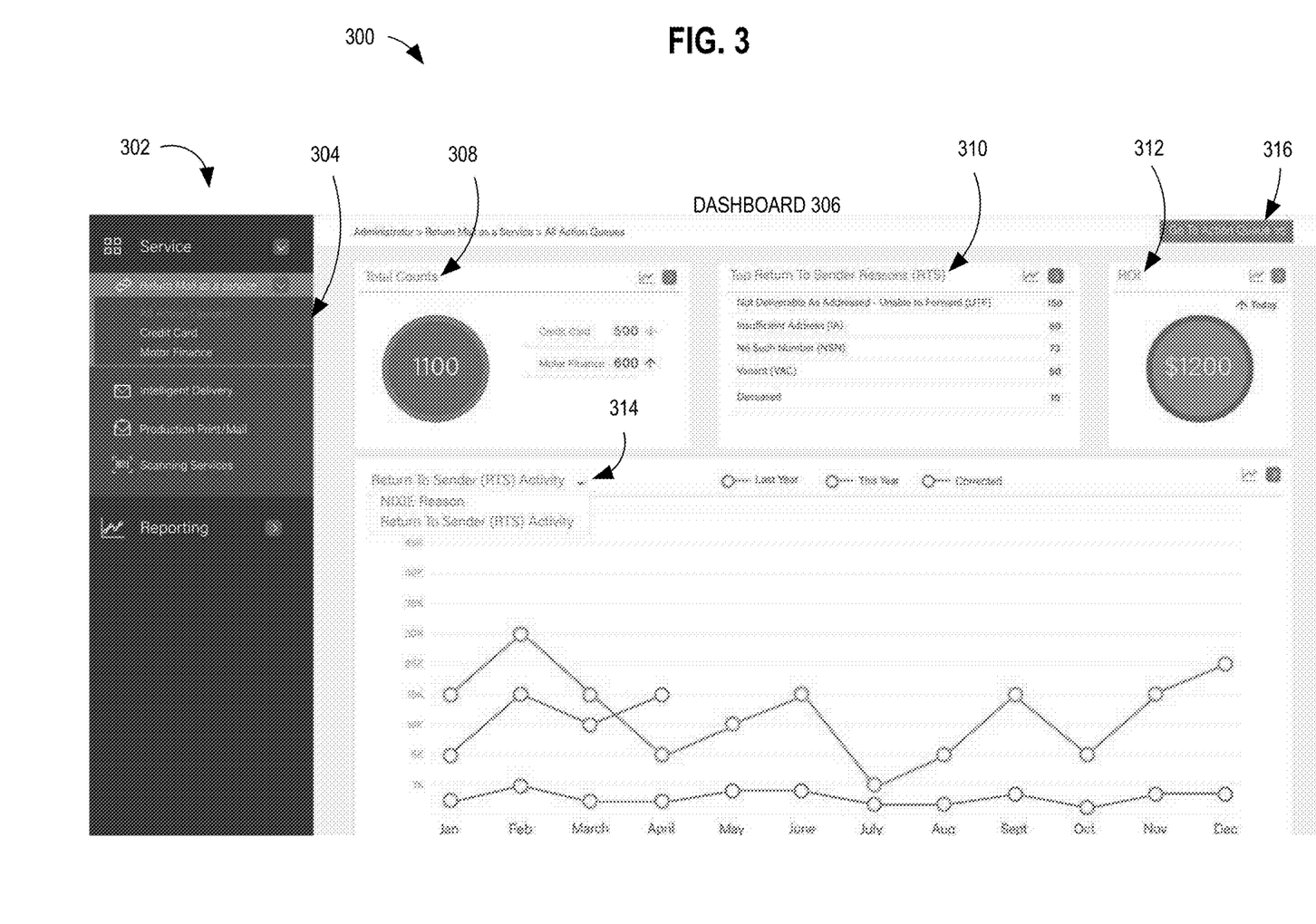
FIG. 3 depicts an example graphical user interface (GUI) displaying features of return mail services.

FIG. 3 depicts an example GUI 300 displaying features of the return mail service portal. When a user logs on to the portal using a username and password, the portal may be configured to display a menu bar 302 and a dashboard 306 associated with the user account.

The menu bar 302 may include a list 304 of action queues that, when selected, show a dashboard 306 with analytics related to the particular departments associated with the action queues. In the example of FIG. 3, the menu bar 302 features an option for all action queues, a credit card action queue, and a motor finance action queue. The credit card action queue may relate to return mail for a department that handles credit cards, while the motor finance action queue may relate to return mail for a department that handles motor finance. The option for all action queues may correspond to the action queues for all departments. While two specific action queues are illustrated in list 304 as an example, any number of action queues that correspond to any number of departments may be listed.

The dashboard 306 may be a summary page featuring analytic data on the return mail. In the example of FIG. 3, the dashboard 306 features analytics on total counts 308, top return to sender (RTS) reasons 310, return on investment (ROI) 312, and RTS activity 314, as further described herein.

The analytics on total counts 308 may track to total number of pieces of mail that have been returned to the sender. The total counts 308 may also feature a break-down by department of the total number of pieces of mail that have been returned to the sender. The dashboard 306 analytics on the top RTS reasons 310 may include a list of how many pieces of mail were returned to the sender for which specific reasons. The reasons may include, for example, "Not Deliverable As Address—Unable to Forward (UTF)", "Insufficient Address (IA)", "No Such Number (NSN)", "Vacant (VAC)", and "Deceased". While there are five different reasons listed in the example of FIG. 3, any number of reasons may be used to categorize the mail. For example, other RTS reason categories, such as "Attempted—Not Known" may also be used. The dashboard 306 analytics on ROI 312 may include, for example, a total dollar amount for the money saved by correcting addresses. For example, if the addresses for unpaid bills that were previously undeliverable had been corrected and resulted in the collection of $1,200 in bills paid, then the ROI 312 may reflect $1,200.

The dashboard 306 analytics on RTS activity 314 may be a graphical representation of how many pieces of mail were returned to the sender and/or corrected over a period of time. In an embodiment, the RTS activity 314 may be viewable as a color-coded line graph or bar graph that tracks and compares past RTS activity, current RTS activity, and the number of corrected pieces of mail. For example, the RTS activity 314 may feature a chronological line chart view with the months along the x-axis and the number of pieces of mail along the y-axis. The number of pieces of mail may be recorded in the hundreds, thousands, tens of thousands, or in any other increment. A first line may represent the RTS activity for last year, a second line may represent the address correction activity for last year, and a third line may represent the RTS activity for this year. Each line may be color-coded a different color.

In another embodiment, the RTS activity 314 may feature a bar graph view broken down by the top RTS reasons. For example, the RTS activity 314 bar graph may feature each of the top RTS reasons along the x-axis and the number of pieces of mail along the y-axis. The number of pieces of mail may be recorded in the hundreds, thousands, tens of thousands, or in any other increment. Each of the top RTS reasons may have three color coded bars representing last year's RTS activity, last year's address correction activity, and this year's RTS activity. Each bar may be color-coded a different color.

The dashboard 306 may also feature an action queue control 316 that, when selected, may display one or more action queues based on the one or more action queues selected in the menu bar 302.

B. Action Queue

Figure 4:
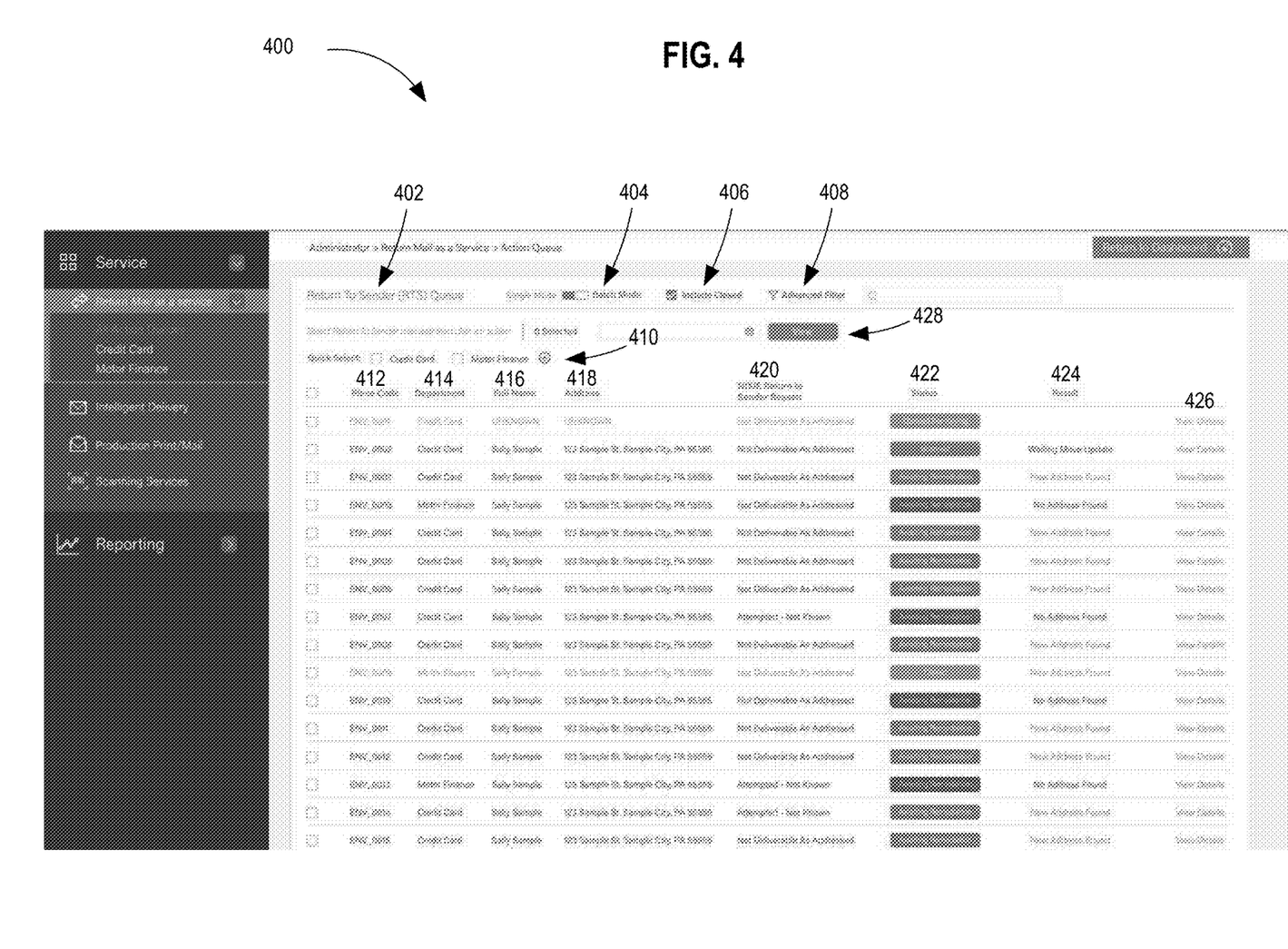
FIG. 4 depicts an example GUI displaying features of return mail services.

FIG. 4 depicts another example GUI 400 displaying features of the return mail service portal. Specifically, upon user selection of the action queue control 316 of the dashboard 306, an action queue 402 may be displayed. The action queue 402 may be a list of pieces of digitized mail with associated information and actionable controls for those pieces of mail based on the data and additional data obtained in step 220 and step 230, respectively.

The pieces of digitized mail may be listed under any number of action queues. In an embodiment, there may be standard categories of action queues, a minimum number of which may be generated and displayed. For example, there may be a minimum of four standard action queue categories that are consistently generated and displayed. The categories may be, for example: RTS, miscellaneous, unclassified, and unreadable/misdirected. The RTS category may be used to classify one or more action queues that list RTS mail. The unreadable/misdirected category may be used to classify one or more action queues that list unreadable and/or misdirected mail. The unclassified category may be used to classify one or more action queues that list unclassified mail. The miscellaneous category may be used to classify one or more action queues that list any miscellaneous mail. While four standard categories are listed in this example, any number of standard categories may be used. In an embodiment, action queues may be variable or non-variable. For example, the RTS category of action queues may consists of one or more action queues, each of which may be configured to be variable or customizable RTS action queues depending on specific needs. The RTS category may have, for example, five variable action queues, each of which may exceed 100 different variations, depending on specific needs. In an embodiment, the miscellaneous, unclassified, and/or unreadable/misdirected categories of action queues may be configured to be non-variable.

In the example of FIG. 4, the action queue 402 may have several option controls such as single mode or batch mode control 404, include closed control 406, and advanced filter control 408. When batch mode is selected from the single mode or batch mode control 404, batch mode may enable processing of mail in batches as opposed to individually. When multiple pieces of mail are selected in batch mode, the portal may be configured to display additional option controls, such as a batch view control 428 or a transfer control, as further described herein. The include closed control 406 may display the action queue 402 with pieces of mail that have already been processed and closed. The advanced filter control 408 may offer additional filtering options. The action queue may also have a quick selection control 410 that enables easy selection of action queues of specific departments for viewing.

The action queue 402 list may include a number of indicators and/or controls, such as a piece code indicator 412, a department indicator 414, a full name indicator 416, an address indicator 418, a RTS reason indicator 420, a status indicator 422, a result indicator 424, and a view details control 426. The piece code indicator 412 may be an alphanumeric identifier for the individual piece of mail. In some embodiments, the piece code indicator 412 may be automatically assigned by the intake application 122 upon scanning. The department indicator 414 may be the designated department that handles that particular piece of mail. In the example of FIG. 4, the action queue 402 list features mail from both the credit card department and the motor finance department; however, any type and number of departments may be used.

The full name indicator 416 may be the full name of the intended recipient of the undeliverable mail. The address indicator 418 may be the attempted delivery address of the recipient. The RTS reason indicator 420 may be the reason the piece of mail was returned. As with the dashboard 306, the reasons may include, for example, "Not Deliverable As Address—Unable to Forward (UTF)", "Insufficient Address (IA)", "No Such Number (NSN)", "Vacant (VAC)", and "Deceased". The reasons may also include other categories, such as "Attempted—Not Known", or any other reason.

The status indicator 422 may be a current status of the undeliverable mail. For example, if a piece of mail has been scanned but has not yet been stored to the database associated with the client device 130, then the status indicator 422 may indicate that the piece of mail has been scanned. The status indicator 422 may also indicate the piece of mail is awaiting remediation, or that the case related to that particular piece of mail is closed. Any type and number of statuses may be used. Moreover, the status indicator may be color-coded based on the actionability of the pieces of mail. For example, once additional data from step 230 has been requested from the second database, a piece of mail that has an awaiting remediation status indicator 422 with a newly identified address may be green in color. In another embodiment, a piece of mail that has an awaiting remediation status indicator 422 with no newly identified address may be a red in color. A piece of mail that has a closed status indicator 422 may be grey in color. Any type and number of colors may be used to indicate actionability.

The result indicator 424 may indicate the results of step 230, such as whether a new address has been found. In an embodiment, the result indicator 424 may indicate "No Address Found", "New Address Found", or any other result of the request for additional data from a address correction database. In an embodiment, the result indicator 424 may indicate that additional information is still being gathered. For example, if the address correction database has received information that the intended recipient has moved but has not yet verified the new address, the result indicator 424 may indicate "Waiting Move Update", for example. Any type and number of result indicators may be used.

The view details control 426 may be a control that, when selected, displays the details of the particular piece of mail, as further described herein. The portal may also feature a batch view control 428 that enables a user to view multiple pieces of mail when the batch feature is selected, as further described herein.

C. Details View

Figure 5:
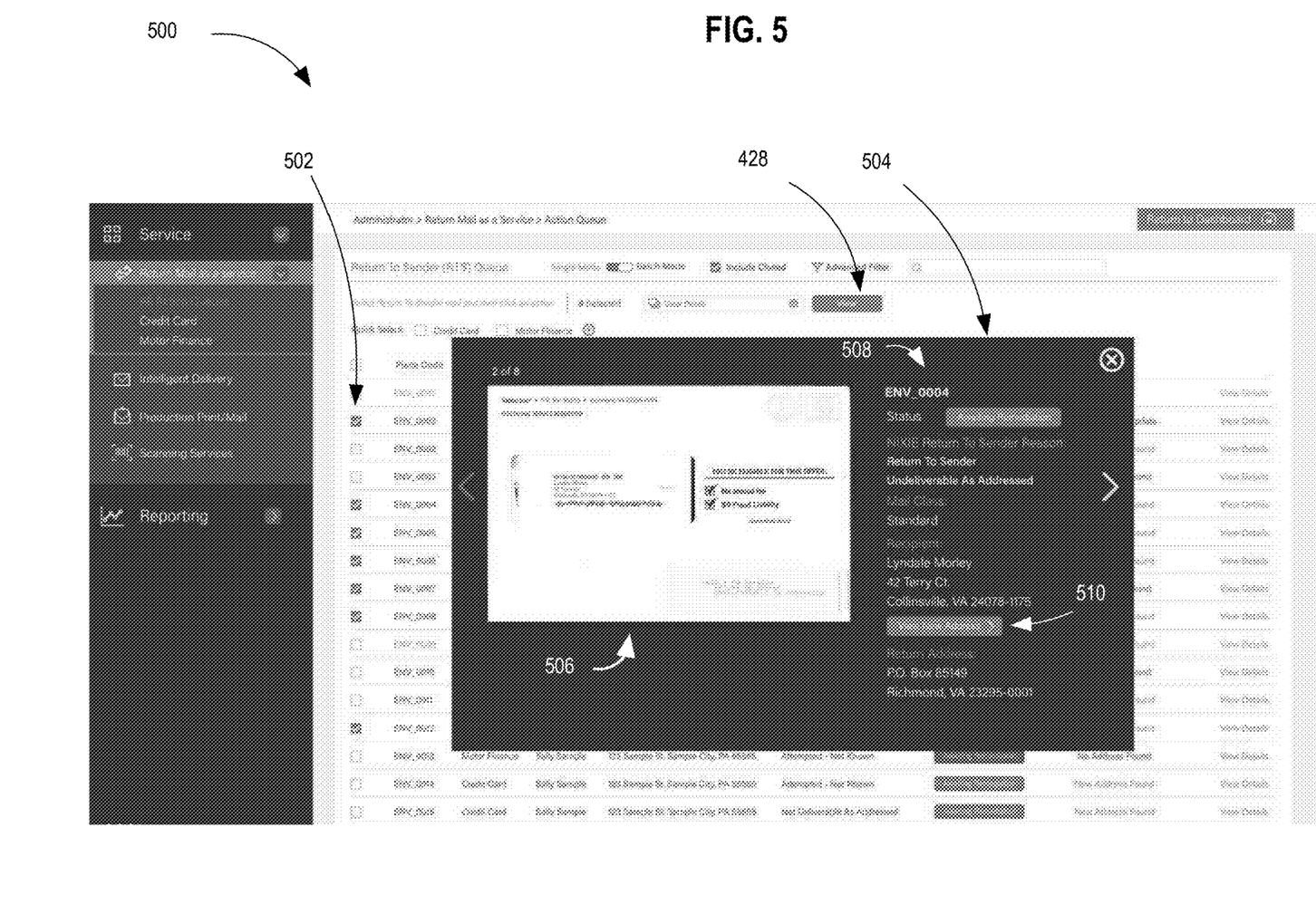
FIG. 5 depicts an example GUI displaying features of return mail services.

FIG. 5 depicts another example GUI 500 displaying features of the return mail service portal. Specifically, FIG. 5 depicts a details window 504 for viewing and correcting addresses for certain pieces of undeliverable mail. In an embodiment, a single view details control 426 may be selected at a time to display a details window 504. In another embodiment, the batch mode control 404 may enable a user to select multiple pieces of mail using, for example, checkboxes 502 associated with each piece of mail. Once the checkboxes 502 are selected, batch view control 428 may be displayed such that selection of the batch view control may display the details window 504.

The details window 504 may display a digital image 506 of the undeliverable mail obtained during step 210, as well as summary data 508. The summary data 508 may include, for example, data obtained during the OCR or encoded data processing extraction of step 220, additional data obtained from other databases during step 230, or any other data that has been generated or compiled by the client device 130. For example, the summary data 508 may visually present the piece code indicator 412, the RTS reason indicator 420, the status indicator 422, the full name indicator 416, and the address indicator 418 in a summary format. The summary data 508 may also include additional data, such as the mail class, the return address of the sender, or any other data obtained during step 220 and step 230. If a new address has been found, then a view new address control 510 may be displayed. Upon selection of the view new address control 510, the new address may be displayed in the details window 504.

D. Transfer

Figure 6:
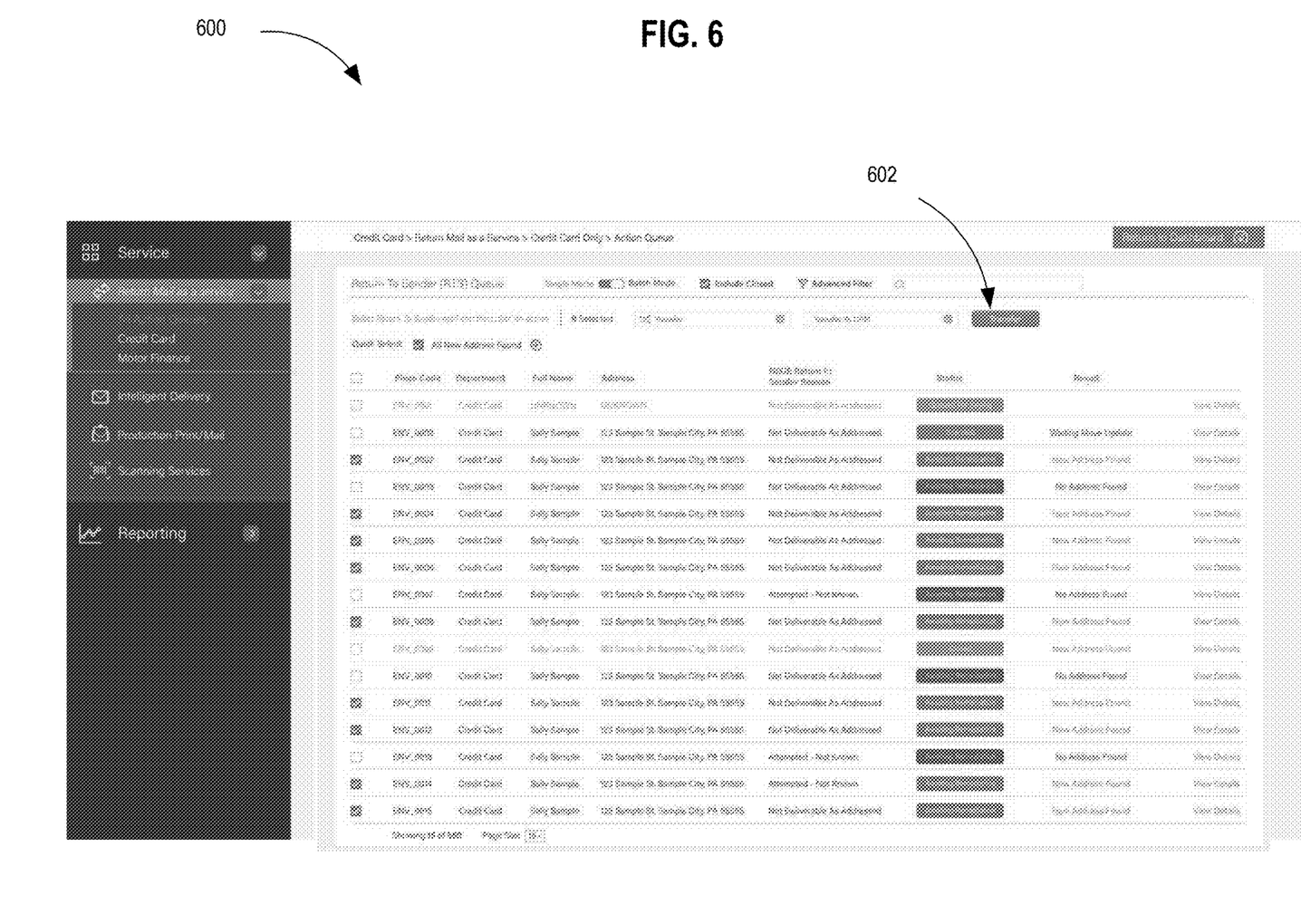
FIG. 6 depicts an example GUI displaying features of return mail services.

FIG. 6 depicts another example GUI 600 displaying features of the return mail service portal. Specifically, FIG. 6 depicts a transfer control 602 that, when selected, transfers or exports the new address to a sender's enterprise resource planning (ERP) or customer relationship management (CRM) system so that the recipient's address may be updated in the sender's databases. This would allow the sender to send a piece of mail to the corrected address during the sender's next mailing cycle. In another embodiment, the portal may feature an option for transferring or exporting the additional data corresponding to the new address to a sender's call center for subsequent follow-up. In another embodiment, the portal may feature an option to forward the UAA mail to the new address.

All action queues and options available may be customizable to fit customer needs and are, therefore, not limited to the embodiments described above. For example, one action queue maybe configured with a first set of actions or options to be performed while a second action queue may be configured with a second set of actions or options to be performed.

Using the foregoing techniques, programmed computers may process, store, organize, display, and manage mailing information in an improved return mail service system that decreases wasteful use of processing resources and increases the efficiency of the overall system. Traditional techniques without the improved techniques described above often result in wasted network bandwidth, computer processing resources, and memory in unsuccessful searches for updated recipient addresses. When these searches fail, not only are senders unable to convey promotions and outstanding bills to recipients, but recipients also miss promotions and suffer credit score decreases due to unpaid bills. The foregoing techniques provide for an improvement in computer and system efficiency by decreasing the excessive use of senders' network bandwidth and decreasing the use of senders' processing resources on resource-intensive and often incomplete searches, by providing a centralized system that organizes and compiles updated return mail information on behalf of the sender. For example, the approaches described above may reduce the amount of processing resources that a sender uses to search for a recipient's new address, thereby reducing the amount of computational and storage resources wasted in trying to update the address. As a result of this increase in computer and system efficiency, customer satisfaction and ROI increase.

V. Implementation Mechanisms

Although the flow diagrams of the present application depict a particular set of steps in a particular order, other implementations may use fewer or more steps, in the same or different order, than those depicted in the figures.

According to one embodiment of the invention, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
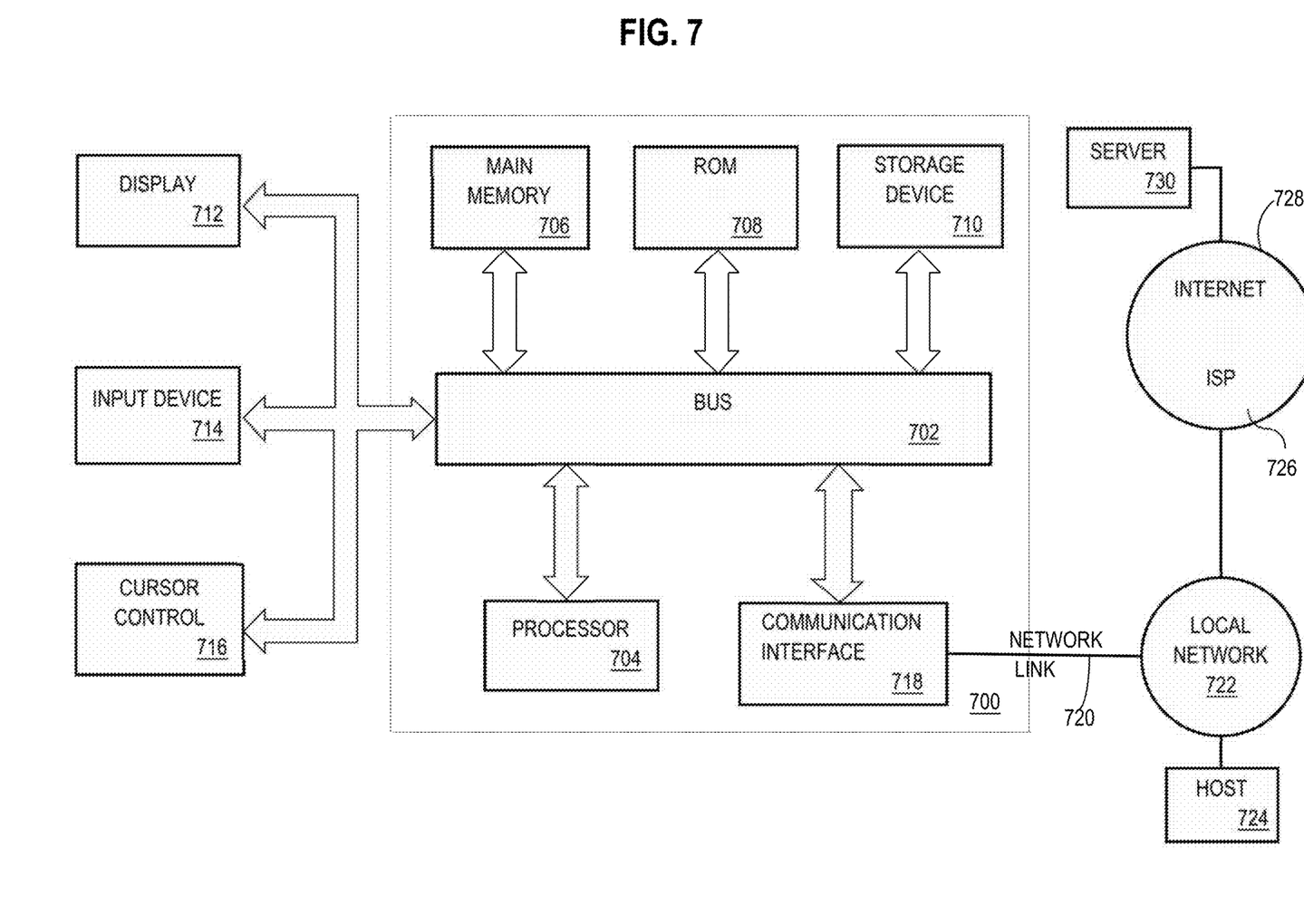
FIG. 7 is a block diagram that depicts an example computer system upon which embodiments may be implemented.

FIG. 7 is a block diagram that depicts an example computer system 700 upon which embodiments of the invention may be implemented. Computer system 700 includes a bus 702 or other communication mechanism for communicating information, and a processor 704 coupled with bus 702 for processing information. Computer system 700 also includes a main memory 706, such as a random-access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), liquid crystal display (LCD), or any other display for displaying information to a computer user. Although bus 702 is illustrated as a single bus, bus 702 may comprise one or more buses. For example, bus 702 may include without limitation a control bus by which processor 704 controls other devices within computer system 700, an address bus by which processor 704 specifies memory locations of instructions for execution, or any other type of bus for transferring data or signals between components of computer system 700.

An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic or computer software which, in combination with the computer system, causes or programs computer system 700 to be a special-purpose machine. According to one embodiment of the invention, those techniques are performed by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a computer to operate in a specific manner. In an embodiment implemented using computer system 700, various non-transitory computer-readable media are involved, for example, in providing instructions to processor 704 for execution. Such a medium may take many forms, including but not limited to, non-volatile media and volatile media. Non-volatile media includes, for example, optical or magnetic disks, such as storage device 710. Volatile media includes dynamic memory, such as main memory 706. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world-wide packet data communication network now commonly referred to as the "Internet" 728. Local network 722 and Internet 728 both use electrical, electromagnetic or optical signals that carry digital data streams.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage device 710, or other non-volatile storage for later execution.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus comprising:
   one or more processors; and
   one or more memories communicatively coupled to the one or more processors and storing instructions which, when processed by the one or more processors, cause:
      receiving and storing in a first database, a digital image of a mail item returned as undeliverable, wherein the mail item returned as undeliverable is a physical mail item for which delivery was attempted but could not be successfully completed;

causing data to be extracted from the digital image of the mail item returned as undeliverable using Optical Character Recognition (OCR) or by processing encoded data;

causing additional data to be obtained from a second database based on the data extracted from the digital image of the mail item returned as undeliverable;

automatically generating one or more user options for processing the mail item returned as undeliverable based upon both the data extracted from the digital image of the mail item returned as undeliverable and the additional data obtained from the second database; and causing the digital image of the mail item returned as undeliverable, the data extracted from the digital image of the mail item returned as undeliverable, the additional data obtained from the second database, and the one or more user options for processing the mail item returned as undeliverable to be displayed using a graphical user interface.

2. The apparatus of claim 1, wherein one or more memories further store additional instructions which, when processed by the one or more processors, cause:

generating a status for the mail item returned as undeliverable based on the data from the first database and the additional data from the second database; and causing the status for the mail item returned as undeliverable to be displayed in association with an action queue using the graphical user interface.

3. The apparatus of claim 1, further comprising:

in response to causing data to be extracted from the digital image of the mail item returned as undeliverable, identifying a sender of the mail item returned as undeliverable based on the data; and automatically classifying the digital image into one or more action queues of a plurality of action queues based on the sender or a type of the mail item returned as undeliverable.

4. The apparatus of claim 3, wherein at least two action queues of the plurality of action queues correspond to a distinct set of actions to be performed on the mail item returned as undeliverable.

5. The apparatus of claim 1, wherein the one or more options for the mail item returned as undeliverable include one or more of a recipient address correction or replacement option.

6. The apparatus of claim 1, wherein the digital image of the mail item returned as undeliverable mail comprises an outer envelope image or an inner content image.

7. The apparatus of claim 1, wherein the second database comprises an address correction database.

8. One or more non-transitory computer-readable media storing instructions which, when processed by one or more processors, cause:

receiving and storing in a first database, a digital image of a mail item returned as undeliverable, wherein the mail item returned as undeliverable is a physical mail item for which delivery was attempted but could not be successfully completed;

causing data to be extracted from the digital image of the mail item returned as undeliverable using Optical Character Recognition (OCR) or by processing encoded data;

causing additional data to be obtained from a second database based on the data extracted from the digital image of the mail item returned as undeliverable;

automatically generating one or more user options for processing the mail item returned as undeliverable based upon both the data extracted from the digital image of the mail item returned as undeliverable and the additional data obtained from the second database; and causing the digital image of the mail item returned as undeliverable, the data extracted from the digital image of the mail item returned as undeliverable, the additional data obtained from the second database, and the one or more user options for processing the mail item returned as undeliverable to be displayed using a graphical user interface.

9. The one or more non-transitory computer-readable media of claim 8, further comprising additional instructions which, when processed by the one or more processors, cause:

generating a status for the mail item returned as undeliverable based on the data extracted from the digital image of the mail item returned as undeliverable and the additional data obtained from the second database; and causing the status for the mail item returned as undeliverable to be displayed using the graphical user interface.

10. The one or more non-transitory computer-readable media of claim 8, further comprising additional instructions which, when processed by the one or more processors, cause:

in response to causing data to be extracted from the digital image of the mail item returned as undeliverable, identifying a sender of the mail item returned as undeliverable based on the data; and automatically classifying the digital image of the mail item returned as undeliverable into one or more action queues of a plurality of action queues based on the sender or a type of the mail item returned as undeliverable.

11. The one or more non-transitory computer-readable media of claim 10, wherein at least two action queues of the plurality of action queues correspond to a distinct set of actions to be performed.

12. The one or more non-transitory computer-readable media of claim 10, wherein the data extracted from the digital image of the mail item returned as undeliverable comprises a recipient address, and wherein the additional data obtained from the second database comprises an updated recipient address.

13. The one or more non-transitory computer-readable media of claim 10, wherein the digital image of the mail item returned as undeliverable comprises an outer envelope image or an inner content image.

14. The one or more non-transitory computer-readable media of claim 10, wherein the second database comprises an address correction database.

15. A method comprising:

receiving and storing in a first database, a digital image of a mail item returned as undeliverable, wherein the mail item returned as undeliverable is a physical mail item for which delivery was attempted but could not be successfully completed;

causing data to be extracted from the digital image of the mail item returned as undeliverable using Optical Character Recognition (OCR) or by processing encoded data;

causing additional data to be obtained from a second database based on the data extracted from the digital image of the mail item returned as undeliverable;

automatically generating one or more user options for processing the mail item returned as undeliverable based upon both the data extracted from the digital image of the mail item returned as undeliverable and the additional data obtained from the second database; and causing the digital image of the mail item returned as undeliverable, the data extracted from the digital image of the mail item returned as undeliverable, the additional data obtained from the second database, and the one or more user options for processing the mail item returned as undeliverable to be displayed using a graphical user interface.

16. The method of claim 15, further comprising:

generating a status for the mail item returned as undeliverable based on the data extracted from the digital image of the mail item returned as undeliverable and the additional data obtained from the second database; and causing the status for the mail item returned as undeliverable to be displayed using the graphical user interface.

17. The method of claim 16, further comprising:

in response to causing data to be extracted from the digital image of the mail item returned as undeliverable, identifying a sender of the mail item returned as undeliverable based on the data extracted from the digital image of the mail item returned as undeliverable; and automatically classifying the digital image of the mail item returned as undeliverable into one or more action queues of a plurality of action queues based on the sender or a type of the mail item returned as undeliverable.

18. The method of claim 17, wherein the digital image of the mail item returned as undeliverable comprises an outer envelope image or an inner content image.

19. The method of claim 18, wherein the data from the digital image of the mail item returned as undeliverable comprises a recipient address, and wherein the additional data from the second database comprises an updated recipient address.

20. The method of claim 19, wherein the second database comprises an address correction database.

* * * * *